United States Patent
Kim et al.

(10) Patent No.: US 7,115,240 B2
(45) Date of Patent: Oct. 3, 2006

(54) METHOD OF PRODUCING NANOPHASE WC-BASED POWDER BY VAPOR PHASE REACTION AT ATMOSPHERIC PRESSURE

(75) Inventors: Byung Kee Kim, Busan-shi (KR); Gook Hyun Ha, Busan-shi (KR)

(73) Assignee: Korea Institute of Machinery and Materials, Daejon (KR)

( * ) Notice: Subject to any disclaimer, the term of this patent is extended or adjusted under 35 U.S.C. 154(b) by 405 days.

(21) Appl. No.: 10/407,563

(22) Filed: Apr. 4, 2003

(65) Prior Publication Data

US 2004/0042953 A1    Mar. 4, 2004

(30) Foreign Application Priority Data

Aug. 29, 2002  (KR) .................. 10-2002-0051386

(51) Int. Cl.
*C01B 31/34* (2006.01)
*C01G 41/00* (2006.01)

(52) U.S. Cl. .................. 423/440; 423/59; 977/775; 977/776

(58) Field of Classification Search ............... 423/440, 423/59; 977/775, 776
See application file for complete search history.

(56) References Cited

U.S. PATENT DOCUMENTS

| | | | | |
|---|---|---|---|---|
| 5,308,597 A | * | 5/1994 | Ledoux et al. | 423/440 |
| 5,427,761 A | * | 6/1995 | Grindatto et al. | 423/440 |
| 6,447,742 B1 | * | 9/2002 | Lackner et al. | 423/440 |
| 6,495,115 B1 | * | 12/2002 | Dunmead et al. | 423/440 |

* cited by examiner

*Primary Examiner*—Wayne Langel
*Assistant Examiner*—Alvin T Raetzsch
(74) *Attorney, Agent, or Firm*—D. Peter Hochberg; Sean Mellino

(57) ABSTRACT

The present invention relates to a method of producing nanophase powder, which can be used as materials for high-strength and wear-resistance cemented carbide. It purports to provide a method of producing WC powder of a 10~20 nm grade by using vapor phase reaction with a precursor containing tungsten. For achieving said objectives, the method of producing WC-based powder according to the present invention comprises preparing a precursor containing tungsten; producing gas by vaporizing said precursor in a reactor; and carburizing said gas in a non-oxidizing atmosphere. The nanophase WC powder produced as such has high-strength and excellent wear-resistance, which can be suitably used as materials for carbide tools, carbide cement, wear-resistance components, or metal molds.

5 Claims, 1 Drawing Sheet

METHOD OF PRODUCING NANOPHASE WC-BASED POWDER BY VAPOR PHASE REACTION AT ATMOSPHERIC PRESSURE

TECHNICAL FIELD

The present invention relates to a method of producing nanophase powder, which is widely used as materials for high-strength and wear-resistance cemented carbide, or more particularly, to a method of producing WC powder of a 10~20 nm grade by using vapor phase reaction with a precursor containing tungsten.

BACKGROUND OF THE INVENTION

Conventionally, WC powder is synthesized by solid phase reaction by mixing together tungsten powder and solid-phase carbon powder, and carburizing the mixture at high temperature. However, since the synthesis method by solid phase reaction involves reducing the initial powder to fine particles by means of a mechanical milling process, it is rather difficult to produce WC powder with particle size of 0.5 μm or less.

Meanwhile, in the 1990's and thereafter, there was commercialization of a synthesis technique, so-called liquid-phase reaction. This is a synthesis technique of obtaining ultra-fine WC/Co powder by using aqueous metal salt by spray-drying such aqueous solution containing W and Co. However, because of the growth of WC particles during the processes of drying aqueous solution, reduction, and carburization heat treatment, this type of synthesis process using liquid-phase posed limitation in producing ultra-fine powder of 0.1 μm or less.

SUMMARY OF THE INVENTION

The present invention purports to provide a method of producing WC cemented carbide powder of 20 nm or less by using vapor phase reaction at atmospheric pressure.

In order to accomplish this objective, with respect to the method of producing WC-based powder from a precursor containing tungsten, the present invention comprises the steps of preparing a precursor containing tungsten, producing gas by vaporizing said precursor, and carburizing said gas in a non-oxidizing atmosphere.

DETAILED DESCRIPTION OF THE PREFERRED EMBODIMENT

The present invention is described in further detail as below. The present invention comprises producing target nanophase powder by directly vaporizing a precursor containing tungsten, and then carburizing the same by heat treatment.

A variety of precursors containing tungsten may be used in the present invention, but it is preferable to use tungsten ethoxide solution, tungsten chloride ($WCl_6$) solution, or solid-phase tungsten hexacarbonyl ($W(CO)_6$). A third element such as Co can be added to the above solution if necessary.

The present invention further comprises vaporizing said precursor into gas, and then carburizing said gas-phase tungsten in a non-oxidizing atmosphere.

Figure 1:
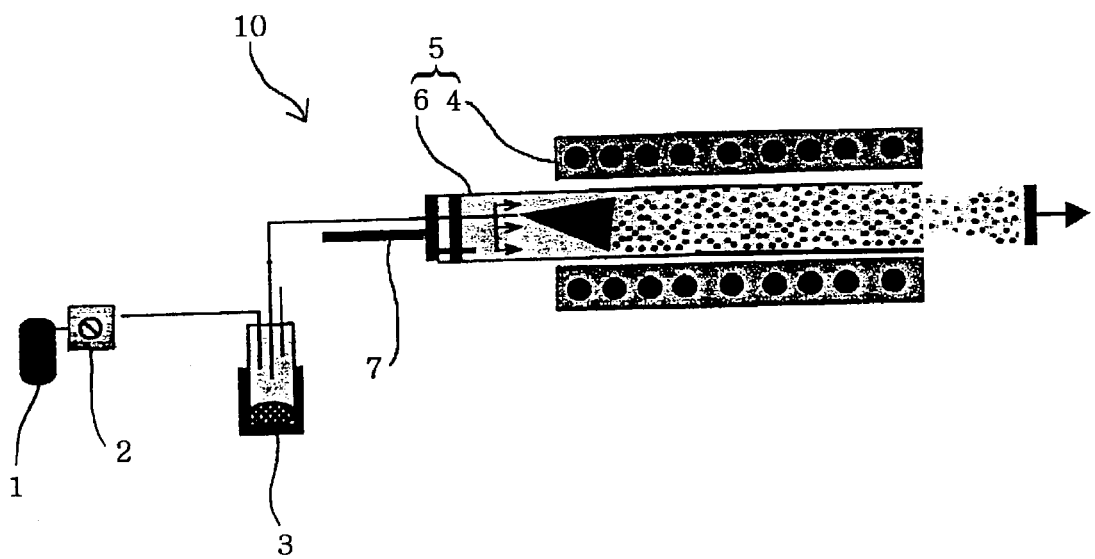
FIG. 1 is a drawing, which schematically illustrates the apparatus for producing nanophase powder according to the present invention.

FIG. 1 illustrates an apparatus for producing nanophase powder by vaporizing and carburizing said precursor according to the present invention. As shown in FIG. 1, the apparatus 10 for producing nanophase powder by vapor phase reaction comprises a pump 2, which supplies precursor from a storage vessel 1; a vaporizer 3, which vaporizes the precursor into gas; a reactor 5 with a heater 4 for heating a heating tube 6 in which the vaporized precursor and carrier gas are mixed; and a supply pipe 7 for carrier gas, which passes to the reactor 5.

The heating tube 6 is made of stainless steel, other equivalent metals, alumina, mullite, silicon carbide, ceramics, or Teflon. It is preferable to use a material which can withstand a temperature, which is 50~150° C. higher than the vaporization temperature of the precursor. The inner diameter of the vaporizer 3 should preferably be 1/30th~1/50th of that of the heating tube 6.

In this type of apparatus, the precursor is fed through the pump 2 connected to one end of the vaporizer 3. Preferably, the flow rate of the precursor should be 0.05~2 cc/min.

When the precursor, which vaporizes while passing through the vaporizer 3, enters into the heating tube 6, the carrier gas flows into the heating tube 6, thereby converting the interior of the heating tube into a non-oxidizing atmosphere. As for carrier gas, He, Ar, $N_2$, or $H_2$, or the mixture thereof can be used. Preferably, the flow rate of the gas should be 10~500 cc/min.

The reactor 5 is heated by using a heater 4 for carrying out carburization heat treatment preferably at temperature of 900~1,500° C.

By using this method of the present invention, the carburization reaction of gas-phase tungsten is rapid, and the resultant powder, which is solidified after carburization, has a particle size of approximately 20 nm or less.

In the present invention, a third element, such as Co, Mo, V, Ni, Cr or Fe, can of course be added to the precursor.

Below, the present invention is described in further detail with references to an example. The example is for illustration purposes only and is not intended to limit the present invention to any specific form. It may be readily known to those skilled in the art that the present invention is not restricted to the example. It is intended that the scope of the present invention be defined by the claims appended hereto and their equivalents.

EXAMPLE

Non-corrosive tungsten ethoxide solution with a vaporization temperature of 290° C. was prepared and fed through the apparatus in FIG. 1 at a flow rate of 0.44 cc/min. In feed, the solution was vaporized and then fed into an alumina tube of a diameter of approximately 60 mm. Argon gas was used as carrier gas at a flow rate of approximately 100 cc/min. By means of heating the reactor, the vaporized precursor was carburized at about 1,100° C.

Figure 2:
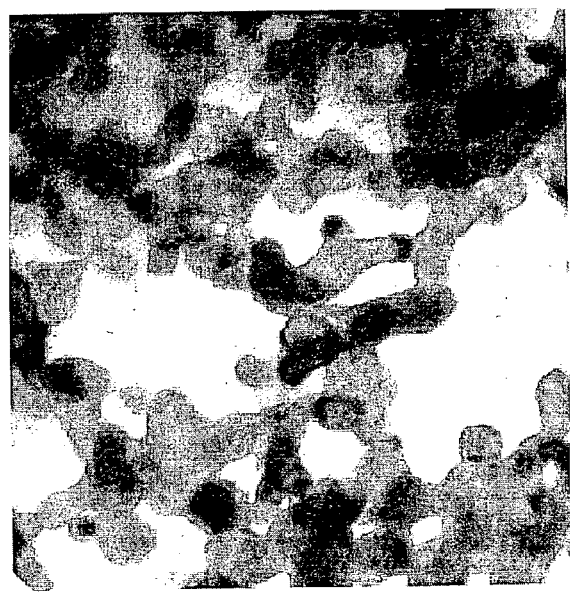
FIG. 2 is a photograph of the structure of the nanophase powder produced according to the present invention.

Then, the WC powder after carburization by heat treatment was collected, after which was observed by an electron microscope (shown in FIG. 2).

In FIG. 2, the particle size of the resultant WC powder produced according to the present invention was shown to be 20 nm or less.

INDUSTRIAL APPLICABILITY

As described in the specification, according to the present invention, WC-based powder of a 10~20 nm grade can be produced through vapor phase reaction at atmospheric pressure. The nanophase powder produced thereby has high-strength and excellent wear-resistance, which can be suitably used as materials for carbide tools, cemented carbide, wear-resistance components, and metal molds.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications and variations that fall within the spirit and scope of the appended claims.

What is claimed is:

1. A method of producing nanophase WC-based powder by a vapor phase reaction at atmospheric pressure, which comprises the steps of:
    preparing a precursor containing tungsten;
    producing gas by vaporizing or sublimating said precursor; and
    carburizing said gas in a non-oxidizing atmosphere.

2. The method of producing nanophase WC-based powder by a vapor phase reaction at atmospheric pressure according to claim 1, wherein said precursor is at least one material selected from the group consisting of tungsten ethoxide, tungsten chloride and tungsten hexacarbonyl.

3. The method of producing nanophase WC-based powder by a vapor phase reaction at atmospheric pressure according to claim 1, wherein said non-oxidizing atmosphere comprises at least one carrier gas selected from the group consisting of He, Ar, $N_2$ and $H_2$.

4. The method of producing nanophase WC-based powder by a vapor phase reaction at atmospheric pressure according to claim 1, wherein said step of carburizing said gas comprises heat treatment at a temperature of 900~1,500° C.

5. A method of producing nanophase WC-based powder by a vapor phase reaction at atmospheric pressure, which comprises the steps of:
    preparing a precursor containing tungsten, said precursor being a source of carbon;
    producing gas by vaporizing or sublimating said precursor; and
    carburizing said gas in a non-oxidizing atmosphere.

* * * * *